US010428700B2

(12) United States Patent
Ikemi et al.

(10) Patent No.: US 10,428,700 B2
(45) Date of Patent: Oct. 1, 2019

(54) HIGHLY WEAR-RESISTANT VALVE SEAT FOR USE IN INTERNAL COMBUSTION ENGINE

(71) Applicant: NIPPON PISTON RING CO., LTD., Saitama (JP)

(72) Inventors: Satoshi Ikemi, Tochigi (JP); Hiroshi Oshige, Tochigi (JP); Kenichi Sato, Tochigi (JP)

(73) Assignee: NIPPON PISTON RING CO., LTD., Saitama (JP)

( * ) Notice: Subject to any disclaimer, the term of this patent is extended or adjusted under 35 U.S.C. 154(b) by 900 days.

(21) Appl. No.: 14/764,299

(22) PCT Filed: Jan. 31, 2014

(86) PCT No.: PCT/JP2014/052241
§ 371 (c)(1),
(2) Date: Jul. 29, 2015

(87) PCT Pub. No.: WO2014/119720
PCT Pub. Date: Aug. 7, 2014

(65) Prior Publication Data
US 2015/0369090 A1    Dec. 24, 2015

(30) Foreign Application Priority Data

Jan. 31, 2013    (JP) .................... 2013-016959

(51) Int. Cl.
*F01L 3/02*    (2006.01)
*F01L 3/20*    (2006.01)
(Continued)

(52) U.S. Cl.
CPC ................ *F01L 3/02* (2013.01); *B22F 1/007* (2013.01); *B22F 1/0014* (2013.01); *B22F 5/106* (2013.01);
(Continued)

(58) Field of Classification Search
CPC ........ B22F 5/106; B22F 1/007; B22F 1/0014; F01L 3/02; F01L 3/20; F01L 2101/00;
(Continued)

(56) References Cited

U.S. PATENT DOCUMENTS 4,734,968 A * 4/1988 Kuroishi ................... B22F 7/06
123/188.8
6,793,876 B2 9/2004 Kawakami et al.
(Continued)

FOREIGN PATENT DOCUMENTS

JP         05-202451       8/1993
JP       2004-124162       4/2004
(Continued)

OTHER PUBLICATIONS

International Search Report, PCT/JP2014/052241, dated Apr. 22, 2014.

*Primary Examiner* — Michael E. La Villa
(74) *Attorney, Agent, or Firm* — Young & Thompson

(57) ABSTRACT

A highly wear-resistant valve seat insert for an internal combustion engine, having a material composition in which hard-particles are uniformly and finely dispersed in the matrix phase, and which is excellent in wear-resistance and radial crushing strength, based on a blended fine powder and a matrix forming powder with a particle size approximately equal to that of the hard-particles so as to prevent the hard-particles from aggregating and thus coarsely dispersing as a hard-particle phase.

5 Claims, 2 Drawing Sheets

(51) Int. Cl.

| | | |
|---|---|---|
| *C22C 38/10* | (2006.01) | |
| *C22C 38/12* | (2006.01) | |
| *B22F 1/00* | (2006.01) | |
| *B22F 5/10* | (2006.01) | |
| *B32B 15/00* | (2006.01) | |
| *C22C 38/18* | (2006.01) | |
| *C22C 29/00* | (2006.01) | |
| *C22C 38/30* | (2006.01) | |
| *C22C 38/08* | (2006.01) | |
| *C22C 30/00* | (2006.01) | |
| *C22C 38/40* | (2006.01) | |
| *B32B 15/01* | (2006.01) | |
| *B32B 1/08* | (2006.01) | |
| *B32B 15/04* | (2006.01) | |
| *B32B 15/18* | (2006.01) | |
| *C22C 33/02* | (2006.01) | |
| *C22C 38/00* | (2006.01) | |
| *C22C 19/07* | (2006.01) | |
| *C22C 27/04* | (2006.01) | |
| *C22C 38/02* | (2006.01) | |
| *C22C 38/04* | (2006.01) | |
| *C22C 38/22* | (2006.01) | |
| *C22C 38/24* | (2006.01) | |
| *C22C 38/44* | (2006.01) | |
| *C22C 38/46* | (2006.01) | |
| *C22C 38/52* | (2006.01) | |
| *C22C 38/60* | (2006.01) | |
| *C22C 38/34* | (2006.01) | |

(52) U.S. Cl.
CPC ................ *B32B 1/08* (2013.01); *B32B 15/00* (2013.01); *B32B 15/01* (2013.01); *B32B 15/011* (2013.01); *B32B 15/04* (2013.01); *B32B 15/043* (2013.01); *B32B 15/18* (2013.01); *C22C 19/07* (2013.01); *C22C 27/04* (2013.01); *C22C 29/00* (2013.01); *C22C 29/005* (2013.01); *C22C 30/00* (2013.01); *C22C 33/02* (2013.01); *C22C 38/00* (2013.01); *C22C 38/02* (2013.01); *C22C 38/04* (2013.01); *C22C 38/08* (2013.01); *C22C 38/10* (2013.01); *C22C 38/105* (2013.01); *C22C 38/12* (2013.01); *C22C 38/18* (2013.01); *C22C 38/22* (2013.01); *C22C 38/24* (2013.01); *C22C 38/30* (2013.01); *C22C 38/34* (2013.01); *C22C 38/40* (2013.01); *C22C 38/44* (2013.01); *C22C 38/46* (2013.01); *C22C 38/52* (2013.01); *C22C 38/60* (2013.01); *F01L 3/20* (2013.01); *F01L 2101/00* (2013.01); *F01L 2103/00* (2013.01); *F01L 2103/01* (2013.01); *F01L 2820/01* (2013.01); *F05C 2201/0436* (2013.01); *F05C 2251/14* (2013.01); *Y10T 428/1259* (2015.01); *Y10T 428/12542* (2015.01); *Y10T 428/12576* (2015.01); *Y10T 428/12583* (2015.01); *Y10T 428/12611* (2015.01); *Y10T 428/12618* (2015.01); *Y10T 428/12854* (2015.01); *Y10T 428/12861* (2015.01); *Y10T 428/12917* (2015.01); *Y10T 428/12931* (2015.01); *Y10T 428/12937* (2015.01); *Y10T 428/12944* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/13* (2015.01); *Y10T 428/215* (2015.01); *Y10T 428/218* (2015.01); *Y10T 428/24273* (2015.01); *Y10T 428/24281* (2015.01)

(58) Field of Classification Search
CPC ............... F01L 2103/00; F01L 2103/01; F01L 2820/01; F05C 2201/0436; F05C 2251/14; C22C 38/34; C22C 38/12; C22C 38/105; C22C 33/02; C22C 38/00; C22C 19/07; C22C 27/04; C22C 38/02; C22C 38/04; C22C 38/22; C22C 38/24; C22C 38/44; C22C 38/46; C22C 38/52; C22C 38/60; C22C 29/00; C22C 29/005; C22C 30/00; C22C 38/08; C22C 38/10; C22C 38/18; C22C 38/30; C22C 38/40; B32B 15/00; B32B 15/01; B32B 15/011; B32B 15/18; B32B 15/04; B32B 15/043; B32B 1/08; Y10T 428/218; Y10T 428/215; Y10T 428/24273; Y10T 428/24281; Y10T 428/12951; Y10T 428/12958; Y10T 428/12965; Y10T 428/12972; Y10T 428/12979; Y10T 428/12993; Y10T 428/12854; Y10T 428/12917; Y10T 428/12931; Y10T 428/12937; Y10T 428/12944; Y10T 428/13; Y10T 428/12861; Y10T 428/12542; Y10T 428/12576; Y10T 428/12583; Y10T 428/1259; Y10T 428/12611; Y10T 428/12618

See application file for complete search history.

(56) References Cited

U.S. PATENT DOCUMENTS

| | | |
|---|---|---|
| 7,273,508 B2 | 9/2007 | Sato et al. |
| 2004/0131492 A1 | 7/2004 | Kawakami et al. |
| 2004/0187830 A1* | 9/2004 | Sato ........................ B21K 1/24 123/188.8 |
| 2005/0193861 A1 | 9/2005 | Sato et al. |
| 2008/0083391 A1 | 4/2008 | Sawada et al. |

FOREIGN PATENT DOCUMENTS

| | | |
|---|---|---|
| JP | 2005-248234 | 9/2005 |
| JP | 2007-107034 | 4/2007 |
| JP | 2007-113101 | 5/2007 |
| JP | 2008-030071 | 2/2008 |
| WO | WO 2009/122985 | 10/2009 |

* cited by examiner

HIGHLY WEAR-RESISTANT VALVE SEAT FOR USE IN INTERNAL COMBUSTION ENGINE

TECHNICAL FIELD

The present invention relates to a valve seat insert which is used in an internal combustion engine and formed in one layer or two layers, and particularly, to further improvement in wear-resistance thereof.

BACKGROUND ART

In the internal combustion engine, the valve seat insert on which the valve to open and close an intake hole and an exhaust hole is seated is required to maintain wear-resistance so that it can sufficiently withstand wear due to repeated contact with the valve as well as to be able to maintain the air-tightness of the combustion chamber. The valve seat insert has been required to be further improved in wear-resistance along with the requirement of a higher output and an improvement in fuel efficiency of the internal combustion engine of recent years. The wear of the valve seat insert has increased particularly in the gaseous fuel engine for CNG, LPG and the like and the engine for an alcohol fuel and the like, and thus the valve seat insert has been required to be further improved in wear-resistance.

To cope with such a requirement, for example, in Patent Literature 1, a method of manufacturing an Fe-matrix sintered alloy valve seat insert which exerts excellent wear-resistance is described. The technique described in Patent Literature 1 is a technique in which a press-compacted body of the mixed powder, which is obtained by blending an Fe-based alloy powder having the composition which contains C: 0.5 to 1.5%, Ni: 0.1 to 3%, Mo: 0.5 to 3%, Co: 3 to 8%, and Cr: 0.2 to 3% by mass, the balance being Fe and unavoidable impurities as a raw material powder for matrix formation and an average particle size of from 20 to 50 μm, and a Co-based alloy powder having the composition which contains Mo: 20 to 32%, Cr: 5 to 10%, and Si: 0.5 to 3% by mass, the balance being Co and unavoidable impurities and an average particle size of from 20 to 50 μm as a raw material powder for the hard dispersing phase formation at a proportion of the Co-based alloy powder with respect to the total amount of the Co-based alloy powder and the Fe-based alloy powder of from 25 to 35% by mass and mixing, is solid phase sintered in a vacuum atmosphere to form an Fe-based sintered alloy substrate in which the hard dispersing phase of Mo—Fe—Co alloy is uniformly distributed in the matrix having the composition which contains C: 0.5 to 1.5%, Ni: 0.1 to 3%, Mo: 0.5 to 3%, Co: 13 to 22%, Cr: 1 to 5%, and Si: 0.1 to 1% by mass, the balance being Fe and unavoidable impurities, and which has a porosity of from 10 to 20%, and copper or a copper alloy is then infiltrated thereinto so as to obtain an Fe-based sintered alloy valve seat insert.

In addition, a method of manufacturing a wear-resistant sintered member is described in Patent Literature 2. In the technique described in Patent Literature 2, 90% by mass or more of the matrix forming powder is a fine powder having the maximum particle size of 46 μm and the hard forming powder is from 40 to 70% by mass of the raw material powder when the raw material powder containing the matrix forming powder and the hard forming powder is compression molding and sintering. Meanwhile, in the technique described in Patent Literature 2, the matrix forming powder is preferably an iron-based alloy powder containing Cr: 11 to 13% by mass. It is described that this makes it possible to further improve the wear-resistance and strength and further to obtain a sintered member excellent in corrosion resistance as well.

Moreover, a method of manufacturing a sintered valve seat insert is described in Patent Literature 3. The technique described in Patent Literature 3 is a method of manufacturing a sintered valve seat insert in which the raw material powder obtained by adding a hard phase forming powder having the maximum particle size of 150 μm and composed of Mo: 20 to 60% by mass, Cr: 3 to 12% by mass, and Si: 1 to 5% by mass and the balance being Co and unavoidable impurities at from 40 to 70% by mass and a graphite powder from 0.8 to 2.0% by mass to a matrix forming powder having the maximum particle size of 74 μm and mixing together is compression-molded and then sintered. Meanwhile, it is described that it is preferable to have a particle size composition in which 90% or more of the matrix forming powder is a powder having a particle size of 46 μm or less and the balance thereof is a powder having a particle size of 74 μm or less. In addition, it is described that it is preferable to use a steel powder containing a relatively great amount of Mo, Cr, Ni, V, Co and the like singly or compositely as the matrix forming powder. Meanwhile, in the invention described in Patent Literature 3, it is described that the pores are filled with copper, a copper alloy, lead, or a lead alloy. It is described that this makes it possible to exert yet further higher wear-resistance even in a harsh environment.

In addition, an iron-matrix sintered alloy material for valve seat insert is described in Patent Literature 4. The technique described in Patent Literature 4 is an iron-matrix sintered alloy material which contains two kinds of hard-particles dispersed therein, and it is described that the first hard-particles are hard-particles having an average primary particle size of from 5 to 20 μm and the second hard-particles are hard-particles having an average primary particle size of from 20 to 150 μm, the first and second hard-particles are selectively used such that as the difference in the particle size between the adjacent peak top positions among the particle sizes corresponding to the peak top positions of the mixing hard-particles when mixed using these particles is in the range of from 15 to 100 μm, and the first hard-particles and the second hard-particles are blended so as to occupy from 10 to 60% by area in total. It is described that this makes it possible to achieve an improvement in wear-resistance, a decrease in aggressiveness to mated valve, an improvement in mechanical strength at the same time when formed into a valve seat insert.

CITATION LIST

Patent Literature

Patent Literature 1: JP 2004-124162 A
Patent Literature 2: JP 2007-107034 A
Patent Literature 3: JP 2007-113101 A
Patent Literature 4: WO 2009/122985 A1

SUMMARY OF INVENTION

Technical Problem

However, in the techniques described in Patent Literatures 1 to 3, a powder which contains a relatively great amount of alloy elements such as Ni, Mo, Co, and Cr as the powder for matrix formation is used, and thus there is still a problem that the compactibility of mixed powder deteriorates and further, the strength, the machinability, the density, and the like decrease.

In addition, in the technique described in Patent Literature 4, there is a problem that the hard-particles aggregate when a great amount of fine hard-particles are contained in order to further improve wear-resistance, and thus it is difficult to uniformly disperse the hard-particles and the aggregated hard-particles also become the origin of wear.

An object of the invention is to solve the problem of the related art and to provide a valve seat insert for internal combustion engine in which hard-particles is uniformly and finely dispersed in the matrix phase and which is excellent in wear-resistance and radial crushing strength and a method of manufacturing the same.

Solution to Problem

The present inventors have conducted intensive investigations on the various factors affecting the dispersion of the hard-particles in the matrix phase in order to achieve the object described above. As a result, it has been found out that the properties of the powder other than the hard-particle powder greatly affect the dispersion of the hard-particles.

Moreover, it has been found out that the hard-particles are prone to aggregate with one another when a great amount of fine hard-particle powder is blended in order to attempt a further improvement in wear-resistance by dispersing fine hard-particles, and thus the hard-particles is rather coarsely dispersed in some cases. It has been found out that this is remarkable in a case where an iron-based powder for matrix formation, such as a pure iron powder and an alloy steel powder is constituted by a coarse powder having a particle size greater compared to the hard-particle powder.

Accordingly, the present inventors have considered that it is important that the hard-particles to be blended in the mixed powder is a fine powder (—#350) having an average particle size of from 15 to 50 μm so as to pass through a sieve of #350 as well as the matrix forming powder (iron-based powder) is a fine powder (—#325) having an average particle size of from 15 to 50 μm so as to pass through a sieve of #325 of the particle size which is approximately equal to that of the hard-particles described above in order to prevent the hard-particles from aggregating and thus coarsely dispersing as a hard-particle phase.

First, the experimental result which is the basis of the invention will be described.

An iron-based powder, a hard-particle powder, a graphite powder, an alloy element powder, and a solid lubricant powder were used as the raw material powder, and the raw material powders were blended by variously changing the kinds thereof and mixed using a V-type mixing machine so as to obtain the mixed powders A and C. These mixed powders were put into a mold and compression-molded by a mechanical press machine so as to form a green compact which had a green density of 7.0 g/cm$^3$ and a valve seat insert shape of one layer. This green compact was subjected to the provisional sintering treatment, further followed by the press compacting, and then subjected to the 2P2S process in which the sintering treatment was performed at a sintering temperature of 1150° C. in a reducing atmosphere so as to obtain an iron-matrix sintered body. Meanwhile, zinc stearate was blended in the mixed powder as a lubricant particle powder at 1.0 part by mass with respect to 100 parts by mass of the total amount of the iron-based powder, the alloy element powder, the graphite powder, the hard-particle powder, and the solid lubricant powder.

In mixed powder A, the iron-based powder, the alloy element powder, the graphite powder, the hard-particle powder, and the solid lubricant powder were used, and 60% by mass of an atomized pure iron powder having an average particle size of from 60 to 80 μm and a high-speed tool steel powder having an average particle size of from 60 to 80 μm in total as the iron-based powder, 35% by mass of a Co-matrix intermetallic compound powder having an average particle size of from 5 to 20 μm and a Co-matrix intermetallic compound powder having an average particle size of from 20 to 150 μm in total as the hard-particle powder, 1.0% by mass of the graphite powder, 2.0% by mass of Ni powder as the alloy element powder, and 2.0% by mass of MnS powder as the solid lubricant powder with respect to the total amount thereof were blended so as to obtain the mixed powder.

In addition, in the mixed powder C, the iron-based powder, the alloy element powder, the graphite powder, the hard-particle powder, and the solid lubricant powder were used, and 60% by mass of an atomized pure iron powder (—#325) having an average particle size of from 15 to 50 μm so as to pass through a sieve of #325 and a high-speed tool steel powder (—#325) having an average particle size of from 15 to 50 μm in total as the iron-based powder, 35% by mass of a Co-matrix intermetallic compound powder (—#350) having an average particle size of from 15 to 50 μm so as to pass through a sieve of #350 as the hard-particle powder, 1.0% by mass of the graphite powder, 2.0% by mass of Ni powder as the alloy element powder, and 2.0% by mass of MnS powder as the solid lubricant powder with respect to the total amount thereof were blended so as to obtain the mixed powder.

The valve seat insert (dimensions: φ30×φ21×8 mm) was processed from the obtained iron-matrix sintered body by cutting and grinding, and the single piece wear test on rig was performed using a single rig wear testing machine. In the single piece wear test on rig, the valve seat insert was pressed in the cylinder head equivalent jig and then the valve was moved up and down by the crank mechanism while heating the valve and the valve seat insert by a heat source that is mounted on the testing machine so as to perform the test. Meanwhile, the wear amount was measured by the sinking amount of the valve. The testing conditions were as follows.

Test temperature: 300° C. (seat surface)

Test time: 6 h

Rotation number of cam: 3000 rpm

Rotation number of valve: 20 rpm

Spring load: 2940 kgf (300 N) (at the time of setting)

Valve material: T400 hardfacing material

Lifted quantity: 9 mm

Meanwhile, the amount of LPG+ Air and the amount of cooling water were constant.

In addition, the valve seat insert (dimensions: φ28×φ22×6.5 mm) was formed from the obtained iron-matrix sintered body by cutting and grinding, and the radial crushing strength was measured in conformity with JIS Z 2507.

From the results thus obtained, the wear-resistance and the radial crushing strength were compared to each other by taking the iron-matrix sintered body (reference material) using the mixed powder A as the reference (1.00), and the result thereof is shown in Table 1.

TABLE 1

| Mixed powder No. | Process | Wear-resistance Ratio of wear amount (reference:1.00) | Radial crushing strength Ratio of radial crushing strength (reference:1.00) |
|---|---|---|---|
| A | 2P2S | 1.00 | 1.00 |
| C | 2P2S | 0.60 | 1.40 |

In the iron-matrix sintered body using the mixed powder C, both the wear-resistance and the radial crushing strength increased as compared to those in the reference material (iron-matrix sintered body using the mixed powder A).

Subsequently, a specimen for structure observation was taken from the iron-matrix sintered body thus obtained, the cross section thereof was polished and etched (etching reagent: marble liquid), and the structure thereof was observed using an optical microscope. An example thereof is illustrated in FIGS. 1(a) and 1(b) along with the schematic diagrams thereof for the iron-matrix sintered body using the mixed powder A and the iron-matrix sintered body using the mixed powder C. As can be seen from FIGS. 1(a) and 1(b), the hard-particles aggregate to form a coarse hard-particle phase in the iron-matrix sintered body using the mixed powder A. In contrast, the aggregation of the hard-particles is not observed but the hard-particle phase is relatively uniformly dispersed in the matrix in the iron-matrix sintered body using the mixed powder C.

From this experimental result, it has been found out that it is possible to uniformly and finely disperse the hard-particle phase in the matrix phase of the sintered body when the sintered body is formed using the mixed powder in which the hard-particle powder blended in the mixed powder is a fine hard-particle powder (—#350) having an average particle size of from 15 to 50 μm and the iron-based powder is a fine iron-based powder (—#325) having an average particle size of from 15 to 50 μm are blended, in other words, fine powders having approximately equal average particle sizes, the average particle size of from 15 to 50 μm, are blended as both the iron-based powder and hard-particle powder and further the powders having a greater size are excluded by the sieves of #350 and #325.

The invention has been completed by further conducting investigations based on the above findings. In other words, the gist of the invention is as follows.

(1) A highly wear-resistant valve seat insert for internal combustion engine, the valve seat insert for internal combustion engine comprising one layer or integrated two layers made by an iron-based sintered body, wherein at least a layer on a valve-contacting face side of the valve seat insert has a matrix part composition which contains C: 0.3 to 2.0% by mass, contains one kind or two or more kinds selected from among Co, Si, Ni, Mo, Cr, Mn, S, W, and V at 70% by mass or less in total, the balance being Fe and unavoidable impurities, and a matrix part structure which contains hard-particles at from 10 to 65% by mass with respect to a total amount of the layer on the valve-contacting face side and disperses the hard-particles at 1000 particles/mm² or more.

(2) The valve seat insert for internal combustion engine according to (1), wherein the hard-particles are Co-based intermetallic compound particles or Fe-based intermetallic compound particles having the Vickers hardness $HV_{0.1}$ of from 500 to 1200 HV.

(3) The valve seat insert for internal combustion engine according to (2), wherein the Co-based intermetallic compound particles are Mo—Fe—Cr—Si-type Co-based intermetallic compound particles.

(4) The valve seat insert for internal combustion engine according to any of (1) to (3), wherein solid lubricant particles are contained in the matrix part structure at from 0.5 to 2.0% by mass with respect to a total amount of the layer on the valve-contacting face side.

(5) The valve seat insert for internal combustion engine according to any of (1) to (4), wherein a layer on a seating face side integrated with the layer on the valve-contacting face side has a matrix part composition which contains C: 0.3 to 2.0% by mass, the balance being Fe and unavoidable impurities or a matrix part composition which contains C: 0.3 to 2.0% by mass, contains one kind or two or more kinds selected from among Mo, Si, Ni, Cr, Mn, S, W, and V at 10% by mass or less in total, the balance being Fe and unavoidable impurities.

(6) The valve seat insert for internal combustion engine according to (5), wherein solid lubricant particles are contained in a matrix phase of the layer on the seating face side at from 0.5 to 2.0% by mass with respect to a total amount of the layer on the seating face side.

(7) A method of manufacturing a highly wear-resistant valve seat insert for internal combustion engine comprising: blending an iron-based powder, a hard-particle powder, and a graphite powder, or further an alloy element powder, or further a solid lubricant particle powder as raw material powders and mixing to obtain a mixed powder; putting the mixed powder into a mold and compression-molding to form a green compact having a predetermined shape and a predetermined density; and sintering the green compact to obtain a valve seat insert which is made of an iron-matrix sintered body and consists of one layer or integrated two layers, wherein at least for formation of a layer on a valve-contacting face side of the valve seat insert, the raw material powders are blended such that a matrix part composition after sintering is a composition which contains C: 0.3 to 2.0% by mass, one kind or two or more kinds selected from among Co, Si, Ni, Mo, Cr, Mn, S, W, and V at 70% by mass or less in total, the balance being Fe and unavoidable impurities, and a powder having an average particle size of from 15 to 50 μm is blended as a part or all of hard-particle powder and a powder having an average particle size of from 15 to 50 μm is blended as the iron-based powder such that a matrix part structure after sintering is a structure which contains hard-particles at from 10 to 65% by mass with respect to a total amount of the layer on the valve-contacting face side and disperses the hard-particles at 1000 particles/mm² or more.

(8) The method of manufacturing a valve seat insert for internal combustion engine according to (7), wherein the hard-particle powder is a Co-based intermetallic compound powder or an Fe-based intermetallic compound powder having the Vickers hardness $HV_{0.1}$ of from 500 to 1200 HV.

(9) The method of manufacturing a valve seat insert for internal combustion engine according to (8), wherein the Co-based intermetallic compound powder is a Mo—Fe—Cr—Si-type Co-based intermetallic compound powder.

(10) The method of manufacturing a valve seat insert for internal combustion engine according to any of (7) to (9), wherein the solid lubricant particle powder is mixed in the matrix phase of the layer on the valve-contacting face side after sintering so as to be from 0.5 to 2.0% by mass with respect to a total amount of the layer on the valve-contacting face side.

(11) The method of manufacturing a valve seat insert for internal combustion engine according to any of (7) to (10), wherein compacting and sintering are further repeated at least one or more times after the sintering.

(12) The method of manufacturing a valve seat insert for internal combustion engine according to any of (7) to (11), wherein the valve seat insert has a layer on a seating face side integrated with the layer on the valve-contacting face side, and for formation of the layer on the seating face side, the mixed powder is a mixed powder obtained by blending an iron-based powder and a graphite powder or further an alloy element powder, or further a solid lubricant particle powder as the raw material powders such that a matrix part composition of a layer on a seating face side after sintering is a composition which contains C: 0.3 to 2.0% by mass and the balance being Fe and unavoidable impurities or a composition which contains C: 0.3 to 2.0% by mass, one kind or two or more kinds selected from among Mo, Si, Ni, Cr, Mn, S, W, and V at 10% by mass or less in total, the balance being Fe and unavoidable impurities and blending a powder having an average particle size of from 60 to 80 μm as the iron-based powder.

(13) The method of manufacturing a valve seat insert for internal combustion engine according to (12), wherein the solid lubricant particle powder is mixed in the matrix of the layer on the seating face side after sintering so as to be from 0.5 to 2.0% by mass with respect to a total amount of the layer on the seating face side.

(14) A valve seat insert for internal combustion engine manufactured by the method of manufacturing a valve seat insert for internal combustion engine according to any of (7) to (13).

Advantageous Effects of Invention

According to the invention, it is possible to easily and inexpensively manufacture a valve seat insert for internal combustion engine in which the hard-particle phase is uniformly and finely dispersed in the matrix phase, and wear-resistance is remarkably improved compared to the related art, and which has high strength, and thus industrially a remarkable effect is exhibited.

DESCRIPTION OF EMBODIMENTS

Figure 1:
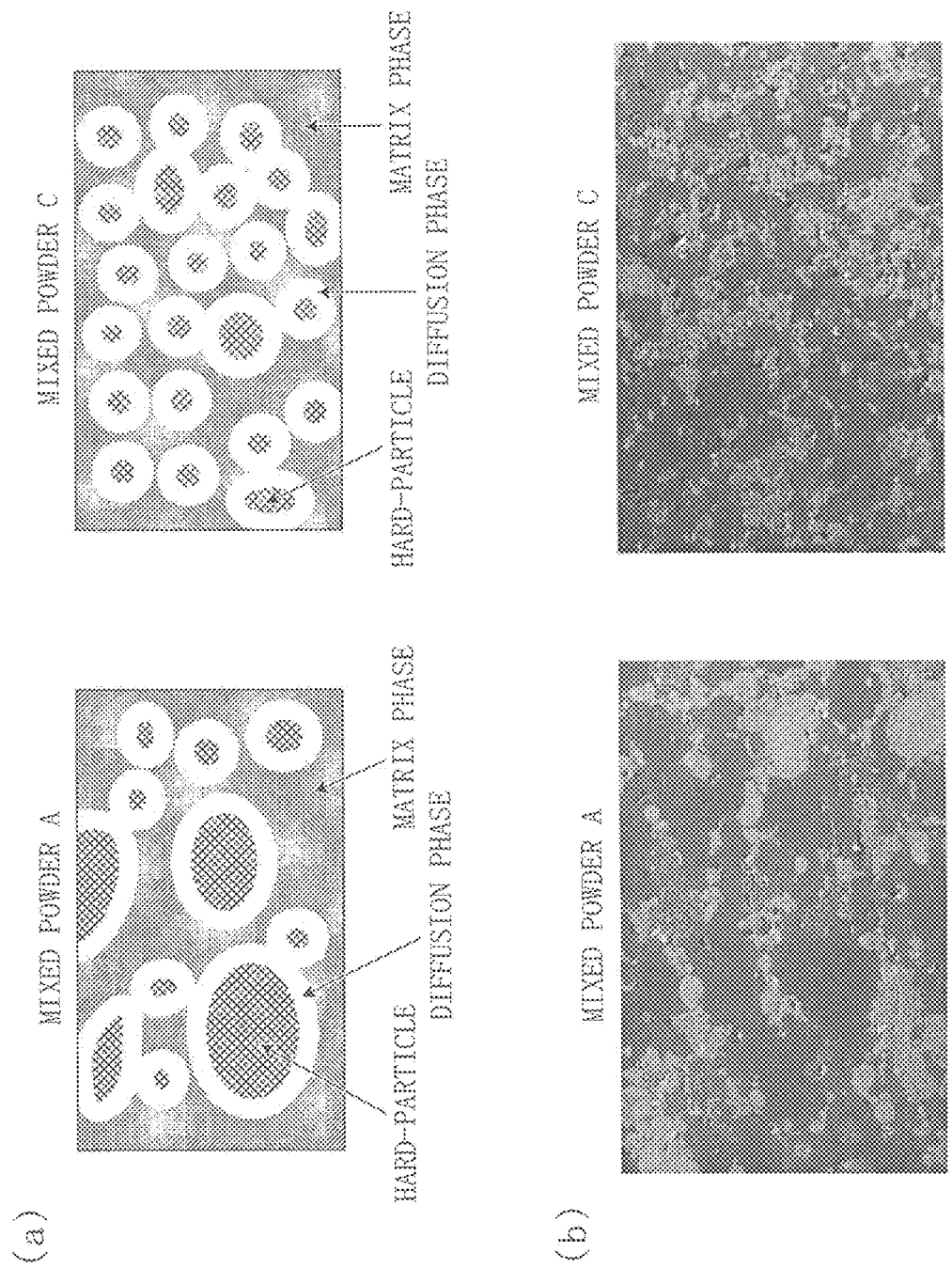
FIGS. 1(a) and 1(b) illustrate the structures observed by an optical microscope (b) of the cross section of the sintered body (valve seat insert) and schematic diagrams thereof (a).

In the invention, an iron-based powder, a graphite powder as an alloy element powder, a hard-particle powder, or further an alloy element powder other than the graphite powder, or further a solid lubricant particle powder, or further a lubricant particle powder are blended as raw material powders and mixed to obtain a mixed powder. Thereafter, the mixed powder thus obtained is putted into a mold and compression-molded to form a green compact having a predetermined shape and a predetermined density. Subsequently, the green compact is sintered to obtain a valve seat insert which is made of an iron-matrix sintered body and consists of one layer or integrated two layers.

An iron-based powder, a graphite powder as an alloy element powder, a hard-particle powder, or further an alloy element powder other than the graphite powder, or further a solid lubricant particle powder, or further a lubricant particle powder are blended as raw material powders in the mixed powder.

The valve-contacting face side layer of the valve seat insert in the invention is made of an iron-based sintered alloy which has a matrix part in which the hard-particles are dispersed in the matrix phase. The wear-resistance of the valve seat insert is remarkably improved as the hard-particles are dispersed in the matrix phase. For this reason, the hard-particle powder to be blended is preferably a powder having the Vickers hardness $HV_{0.1}$ of from 500 to 1200 HV. Examples of such a powder may include a Co-based intermetallic compound powder or an Fe-based intermetallic compound powder, or an Fe—Mo-type hard-particle powder. Among them, the Co-based intermetallic compound particles are particles in which an intermetallic compound having a high hardness is dispersed in a relatively soft Co matrix and which have a characteristic exhibiting low aggressiveness to mated material, and thus are preferable. In addition, examples of the Co-based intermetallic compound powder may include a Si—Cr—Mo-type Co-based intermetallic compound, a Si—Ni—Cr—Mo-type Co-based intermetallic compound, and a Mo—Fe—Cr—Si-type Co-based intermetallic compound powder, and examples of the Fe-based intermetallic compound powder may include a Co—Ni—Cr—Mo-type Fe-based intermetallic compound. Meanwhile, it is preferable that the hardness of the Co-based intermetallic compound particles and the Fe-based intermetallic compound particles be from 500 to 1200 $HV_{0.1}$.

Among the Co-based intermetallic compound particles, the Mo—Fe—Cr—Si-type Co-based intermetallic compound particles exhibit remarkable acting to improve wear-resistance particularly as the hard-particles. The composition of the Mo—Fe—Cr—Si-type Co-based intermetallic compound particles is preferably composed of Mo: 35 to 47%, Fe: 3 to 15%, Cr: 3 to 10%, Si: 2 to 5% by mass, and the balance being Co and unavoidable impurities.

In addition, in the invention, the hard-particles are blended in the layer on the valve-contacting face side such that the matrix part structure after sintering is a structure which contains hard-particles at from 10 to 65% by mass with respect to the total amount of the valve-contacting face side layer and in which the hard-particles are dispersed at 1000 particles/mm$^2$ or more.

It is impossible to secure the desired wear-resistance when the amount of the hard-particles dispersed is less than 10%. On the other hand, the effect is saturated when the dispersion exceeds 65%, and thus it is impossible to expect the effect to meet the amount added. For this reason, the amount of the hard-particles dispersed in the valve-contacting face side layer is limited in the range of from 10 to 65% by mass with respect to the total amount of the valve-contacting face side layer. In addition, it is more preferably from 30 to 40%.

In the invention, the number of the hard-particles dispersed is an index of the fine and uniform dispersion of the hard-particles. In the invention, the hard-particles are limited to the content described above and the dispersed number of 1000 particles/mm$^2$ or more in the valve-contacting face side layer. The aggregation of the hard-particles is significant when the number of the hard-particles dispersed is less than 1000 particles/mm$^2$, and thus it is impossible to expect a remarkable improvement in wear-resistance. For this reason, the number of hard-particles dispersed is limited to 1000 particles/mm$^2$ or more. In addition, the number is preferably from 1200 to 2000 particles/mm$^2$.

Meanwhile, the number of hard-particles dispersed is determined as follows. The heavy metals contained in the hard-particles are analyzed using a scanning electron microscope with an analyzer, the image (COMP image) thereof is taken, the independent hard-particle is identified from the distributed situation thereof, and the number of per unit area is measured. Meanwhile, it is preferable to perform the measurement of the number by binarizing into the COMP image of the heavy metal elements contained in the hard-particles and the COMP image of the elements other than those heavy elements in order to facilitate the measurement.

In addition, the solid lubricant may be further contained in the valve-contacting face side layer at from 0.5 to 2.0% by mass with respect the total amount of the layer on the valve-contacting face side in addition to the hard-particles described above. The desired lubrication effect cannot be expected and the machinability also deteriorates when the content is less than 0.5%. On the other hand, the machinability improving effect is saturated and a decrease in strength is also caused when the content exceeds 2.0%. For this reason, it is preferable that the solid lubricant is limited in the range of from 0.5 to 2.0% in the case of being contained. Examples of the solid lubricant may include MnS and $CaF_2$.

In addition, in the invention, for formation of the layer in the case of one layer or for formation of the layer on the valve-contacting face side in the case of integrated two layers, the raw material powders are blended in the mixed powder such that the matrix part composition after sintering has a composition which contains the matrix phase, the hard-particles as described above or further the solid lubricant particles, contains C: 0.3 to 2.0% by mass, further contains one kind or two or more kinds selected from among Co, Si, Ni, Mo, Cr, Mn, S, W, and V at 70% by mass or less in total, and the balance being Fe and unavoidable impurities.

The reason to limit the composition of the matrix part will be described. Here, the "%" means % by mass unless otherwise specified.

C: 0.3 to 2.0%

C is an element which increases the strength and hardness of the sintered body and facilitates the diffusion of metal atoms at the time of sintering, and it is preferable to contain C at 0.3% or more in the invention. On the other hand, there is a problem that a liquid phase is easily generated at the time of sintering and the dimensional accuracy decreases as well as cementite is easily produced in the matrix when the content exceeds 2.0%. For this reason, C is limited in the range of from 0.3 to 2.0%. In addition, it is preferably from 0.9 to 1.1%.

One kind or two or more kinds selected from among Co, Si, Ni, Mo, Cr, Mn, S, W, and V: 70% or less in total All of Co, Si, Ni, Mo, Cr, Mn, S, W, and V are elements which increase the strength and hardness of the sintered body and further to improve the wear-resistance, and it is desirable to select at least one kind among them to be contained at 25% or more in total including the element originating in the hard-particles in order to obtain such an effect. On the other hand, the compactibility deteriorates and the strength also decreases when the content of these elements exceeds 70% in total. For this reason, the content of one kind or two or more kinds selected from among Co, Si, Ni, Mo, Cr, Mn, S, W, and V is limited to 70% or less in total. In addition, it is preferably 60% or less in total and even more preferably 40% or less.

The balance of the valve-contacting face side layer other than the components described above is composed of Fe and unavoidable impurities.

In addition, the hard-particles to be blended in the mixed powder as a raw material powder are dispersed in the matrix phase in the sintered body and contribute to the wear-resistance improvement. The powder tends to be finely dispersed in the matrix as the powder to be blended as the hard-particles is fine, and thus it is preferable to use a powder which is as fine as possible in order to improve the wear-resistance. For this reason, in the invention, the hard-particle powder is a powder having an average particle size of from 15 to 50 μm (about –#350) of a fine hard-particle powder from the viewpoint of manufacturability, particularly fluidity. Meanwhile, with regard to the measurement of the average particle size of the powder, for example, a value measured using a laser diffraction method is adopted.

In the invention, the iron-based powder which is blended in the mixed powder as one of the raw material powders and constitutes the matrix is preferably a powder having an average particle size which is substantially the same as or smaller than the average particle size of the hard-particle powder. The hard-particle powder is prone to aggregate when the iron-based powder that forms the matrix is greater than the average particle size of the hard-particle powder, and thus it is difficult to uniformly and finely disperse the hard-particle powder. For this reason, in the invention, the iron-based powder to be blended is a powder having an average particle size of from 15 to 50 lam, which has substantially the same average particle size as the hard-particles. Meanwhile, the average particle size is preferably from 25 to 35 μm.

Meanwhile, examples of the iron-based powder to be blended may include an atomized pure iron powder, an alloy steel powder having a total amount of the alloy elements of 5% by mass or less, and a high-speed tool steel powder. These powders are preferably blended singly or compositely so as to meet the matrix part composition after sintering.

A powder to be blended in the mixed powder other than the hard-particle powder, the solid lubricant powder, the iron-based powder, for example, an alloy element powder such as a Ni powder, a Co powder, and a graphite powder is also preferably a powder having an average particle size of from 15 to 50 μm from the viewpoint of finely dispersing the hard-particles. It is impossible to finely disperse the hard-particles when using a powder greater than the average particle size described above.

On the other hand, in a case where the valve seat insert has the layer on the seating face side (seating face side layer) which is integrated with the valve-contacting face side layer, the seating face side layer is integrated with the valve-contacting face side layer via the boundary face by sintering and is made of the iron-based sintered alloy in the same manner as the valve-contacting face side layer. The seating face side layer is not in contact with the valve but supports the valve-contacting face side layer and thus preferably has a composition which can simply secure the desired strength as the valve seat insert.

For formation of the layer on the seating face side, it is preferable to use a mixed powder obtained by blending and mixing the iron-based powder and the graphite powder or further the alloy element powder, or further the solid lubricant particle powder as the raw material powders. Meanwhile, in this case, as the iron-based powder to be blended as the raw material powder, any of the same powders as those for the valve-contacting face side layer is suitable, an atomized iron powder is preferable and moreover a powder having an average particle size of from 60 to 80 µm is preferable.

In addition, the solid lubricant particle powder may be contained in the seating face side layer at from 0.5 to 2.0% by mass with respect to the total amount of the seating face side layer. It is impossible to expect the desired lubrication effect and the machinability also deteriorates when the content is less than 0.5%. On the other hand, the machinability improving effect is saturated and a decrease in strength is also caused when the content exceeds 2.0%. For this reason, it is preferable that the solid lubricant be limited in the range of from 0.5 to 2.0% in the case of being contained. Examples of the solid lubricant may include MnS and $CaF_2$.

It is preferable to blend the raw material powders in the mixed powder for formation of the layer on the seating face side such that the matrix phase composition after sintering (meanwhile, matrix part composition including the solid lubricant particles in a case where the solid lubricant particles are dispersed) is a composition which contains C: 0.3 to 2.0% by mass, or further contains one kind or two or more kinds selected from among Mo, Si, Ni, Cr, Mn, S, W, and V at 10% by mass or less in total, and the balance being Fe and unavoidable impurities.

Meanwhile, the reason to limit the matrix phase composition of the seating face side layer after sintering (meanwhile, matrix part composition including the solid lubricant particles in a case where the solid lubricant particles are dispersed) is as follows.

C: 0.3 to 2.0%

C is an element which increases the strength and hardness of the sintered body, and in the invention, it is desirable to contain C of 0.3% or more in the seating face side layer in order to secure the desired strength and the hardness as the valve seat insert. However, there is a problem that a liquid phase is easily generated at the time of sintering and the dimensional accuracy decreases as well as cementite is easily produced in the matrix when the content exceeds 2.0%. For this reason, it is preferable to limit C in the range of from 0.3 to 2.0%. In addition, it is more preferably from 0.9 to 1.1%.

The component described above is the basic component of the seating face side layer, and further one kind or two or more kinds selected from among Co, Si, Ni, Mo, Cr, Mn, S, W, and V may be contained at 10% or less in total as the selective element in addition to this basic composition.

One kind or two or more kinds selected from among Co, Si, Ni, Mo, Cr, Mn, S, W, and V: 10% or less in total.

All of Co, Si, Ni, Mo, Cr, Mn, S, W, and V are elements which increase the strength and hardness of the sintered body, and it is possible to select one kind or two or more kinds among them to be contained if necessary. It is desirable to contain these elements at 1% or more in total in order to obtain such an effect, but the effect is saturated when the content of these elements is more than 10% in total, thus it is impossible to expect the effect to meet the amount added, and it is economically disadvantageous as a result. For this reason, it is preferable to limit the content of these elements to 10% or less in total in the case of being contained. In addition, it is more preferably from 5 to 6%.

Meanwhile, the balance of the seating face layer other than those described above is composed of Fe and unavoidable impurities.

Next, the preferred method of forming the valve seat insert will be described.

In the invention, it is preferable to use a press compacting machine having a die, a core rod, an upper punch, a lower punch, and two kinds of feeder capable of being independently driven from each other. Hereinafter, the method of forming a valve seat insert consisting of two layers of the valve-contacting face side layer and the seating face side layer will be described as an example.

First, the lower punch is relatively lowered to form a filling space for the seating face side layer by the lower punch, the die, and core rod, and the filling space is filled with the mixed powder for the seating face side layer by moving the first feeder. Subsequently, the die and the core rod are relatively raised with respect to the lower punch to form a filling space for the valve-contacting face side layer, and the filling space is filled with the mixed powder for the valve-contacting face side layer by moving the second feeder. Thereafter, the upper punch is lowered, and the mixed powder for the valve-contacting face side layer and the mixed powder for the seating face side layer are integrally pressed to form a green compact. Meanwhile, the pressing conditions may be appropriately determined according to the desire and are not particularly required to limit. It is preferable to adjust the (pressing) conditions so as to have a green compact density in the range of from 5.0 to 7.5 $g/cm^3$ with regard to the desired characteristics of the valve seat insert.

Thereafter, the green compact thus obtained is subjected to the sintering treatment so as to obtain a sintered body having a two-layer structure of the upper and the lower. The conditions for the sintering treatment may be appropriately determined according to the desired properties except performing in a reducing atmosphere and are not particularly required to limit. Meanwhile, the sintering temperature is preferably from 1100 to 1200° C. from the viewpoint of the sintering diffusion.

Meanwhile, the so-called 2P2S process in which the press compacting and the sintering treatment are repeated at least two times is preferable from the viewpoint of securing strength. In the 2P2S process, it is preferable that the first sintering treatment be a provisional sintering and the sintered body having the desired density be obtained by the second sintering treatment. By virtue of this, a further improvement in density is expected. In addition, the forging-sintering process, FS process in which the sintering treatment is performed after the forging may be adopted instead of the 2P2S process.

Hereinafter, the invention will be further described based on Examples.

Examples

The raw material powders shown in Table 2 were blended in the blending amounts shown in Table 2 and mixed using a V-type mixing machine, thereby preparing various mixed powders for the valve-contacting face side layers and various mixed powders for the seating face side. Meanwhile, the kind and the average particle size of the iron-based powders and the hard-particle powders used are collectively shown in Table 3. Meanwhile, the mixed powder No. A1 is a blending example of the related art (Conventional Example).

These mixed powders were made into green compacts having two layers of the upper and the lower using a press compacting machine which had a die, a core rod, an upper punch, a lower punch, and two kinds of feeder capable of being independently driven from each other.

First, the lower punch was relatively lowered to form a filling space for the seating face side layer by the lower punch, the die, and core rod, and the filling space was filled with the mixed powder for the seating face side layer by moving the first feeder. Subsequently, the die and the core rod were relatively raised with respect to the lower punch to form a filling space for the valve-contacting face side layer, and the filling space was filled with the mixed powder for the valve-contacting face side layer by moving the second feeder. Thereafter, the upper punch was lowered, and the mixed powder for the valve-contacting face side layer and the mixed powder for the seating face side layer were integrally pressed to form a green compact having two layers of the upper and the lower. Meanwhile, a green compact having one layer was formed in some cases. In those cases, the first feeder was not used.

The green compact thus obtained was subjected to the 2P2S process in which the provisional sintering was performed, further the press compacting (face pressure: 6 to 10 ton/cm$^2$) by a powder compacting machine was performed, and then the sintering treatment (1100 to 1200° C. in a reducing atmosphere) was performed so as to obtain a sintered body. Meanwhile, the 1P1S process in which compacting and sintering were performed one time was adopted for some sintered bodies. In addition, the FS process in which the forging-sintering process was performed was adopted instead of the 2P2S process for some sintered bodies. Meanwhile, the thickness of the sintered body was 8 mm, and the ratio of the upper layer to lower layer was 1:1 in the case of having two layers.

The analytical sample was taken from each layer of the sintered body thus obtained, and the content of each element was determined by the emission spectrochemical analysis. The cross-section on the inner side than the boundary face of the two layers was subjected to the measurement.

Moreover, the density of the sintered body thus obtained was measured using the Archimedes method.

Figure 2:
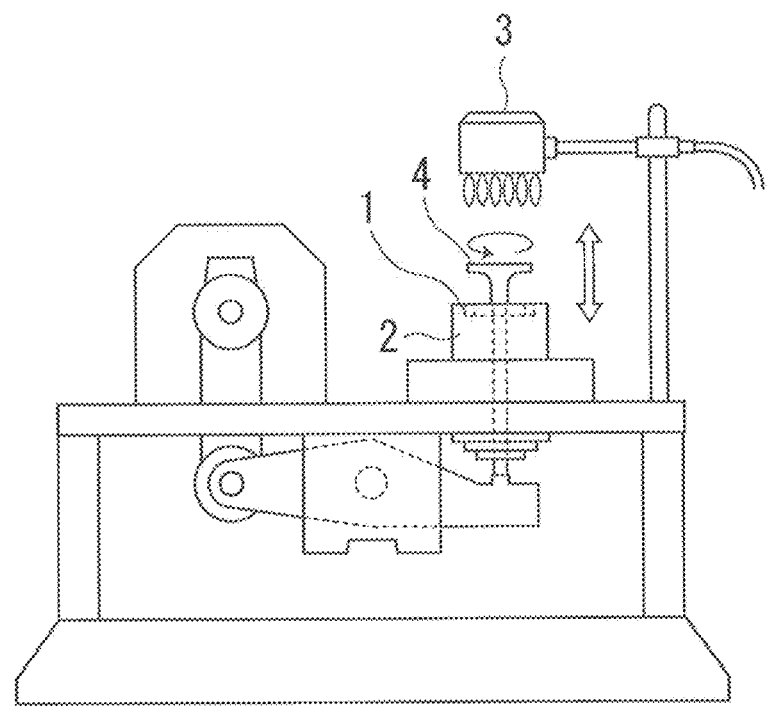
FIG. 2 is a schematic diagram illustrating the overview of a single rig testing machine.

In addition, the valve seat insert (sintered body) thus obtained was introduced into a single rig wear testing machine illustrated in FIG. 2, the machine was operated under the following testing conditions to measure the depth of the depression on the specimen (valve seat insert) after the test, and the wear amount (μm) was calculated. The ratio of the wear amounts of the sintered bodies was calculated by taking the wear amount of the sintered body No. 1 as the reference (1.00). The wear-resistance was evaluated by granting ○ in a case where the wear amount is less than the reference and X in other cases.

Test temperature: 300° C. (seat surface)
Test time: 6 hr
Rotation number of cam: 3000 rpm
Rotation number of valve: 20 rpm
Spring load: 2940 kgf (300 N) (at the time of setting)
Lifted quantity: 9 mm
Valve material: T400 hardfacing material Meanwhile, the amount of LPG+ Air and the amount of cooling water were constant.

In addition, a valve seat insert (dimensions: ϕ28×ϕ22×6.5 mm) was formed from the iron-matrix sintered body thus obtained by cutting and grinding, and the radial crushing strength was measured in conformity with JIS Z 2507. The ratio of the radial crushing strengths of the sintered bodies was calculated by taking the radial crushing strength of the sintered body No. 1 as the reference (1.00). The radial crushing strength was evaluated by granting ○ in a case where the radial crushing strength is higher than the reference and X in other cases.

The results thus obtained are shown in Table 4 and Table 5.

TABLE 2

| | Blending ratio | | | | | | |
|---|---|---|---|---|---|---|---|
| Mixed powder No. | Iron-based powder Kind*: blending amount (% by mass) | Graphite powder Blending amount (% by mass) | Alloy element powder Kind: blending amount (% by mass) | Hard-particle powder Kind*: blending amount (% by mass) | Solid lubricant particle powder Kind**: blending amount (% by mass) | Lubricant particle powder Kind***: blending amount (part by mass) | Remarks |
| A1 | a: 50.0, b: 10.0 | 1.0 | Ni: 2.0 | A: 10.0, B: 25.0 | SR1: 2.0 | P1: 1.0 | For valve-contacting face side layer |
| B1 | a: 50.0, b: 10.0 | 1.0 | Ni: 2.0 | A: 35.0 | SR1: 2.0 | P1: 1.0 | |
| C1 | c: 50.0, d: 10.0 | 1.0 | Ni: 2.0 | A: 35.0 | SR1: 2.0 | P1: 1.0 | |
| D1 | c: 50.0, d: 10.0 | 1.0 | Ni: 2.0 | A: 10.0, B: 25.0 | SR1: 2.0 | P1: 1.0 | |
| E1 | c: 45.0, d: 10.0 | 1.0 | Ni: 2.0 | A: 40.0 | SR1: 2.0 | P1: 1.0 | |
| F1 | c: 35.0, d: 10.0 | 1.0 | Ni: 2.0 | A: 50.0 | SR1: 2.0 | P1: 1.0 | |
| G1 | c: 51.5, d: 10.0 | 1.0 | Ni: 2.0 | A: 35.0 | SR1: 0.5 | P1: 1.0 | |
| H1 | c: 55.0, d: 5.0 | 1.0 | Ni: 2.0 | A: 35.0 | SR1: 2.0 | P1: 1.0 | |
| I1 | c: 40.0, d: 20.0 | 1.0 | Ni: 2.0 | A: 35.0 | SR1: 2.0 | P1: 1.0 | |
| J1 | c: 48.0, d: 10.0 | 1.0 | Ni: 4.0 | A: 35.0 | SR1: 2.0 | P1: 1.0 | |
| K1 | c: 49.8, d: 10.0 | 1.2 | Ni: 2.0 | A: 35.0 | SR1: 2.0 | P1: 1.0 | |
| L1 | c: 50.2, d: 10.0 | 0.8 | Ni: 2.0 | A: 35.0 | SR1: 2.0 | P1: 1.0 | |
| M1 | b: 10.0, e: 50.0 | 1.0 | Ni: 2.0 | A: 35.0 | SR1: 2.0 | P1: 1.0 | |
| N1 | d: 10.0, f: 50.0 | 1.0 | Ni: 2.0 | A: 10.0, B: 25.0 | SR1: 2.0 | P1: 1.0 | |

TABLE 2-continued

| | Blending ratio | | | | | | |
|---|---|---|---|---|---|---|---|
| Mixed powder No. | Iron-based powder Kind*: blending amount (% by mass) | Graphite powder Blending amount (% by mass) | Alloy element powder Kind: blending amount (% by mass) | Hard-particle powder Kind*: blending amount (% by mass) | Solid lubricant particle powder Kind**: blending amount (% by mass) | Lubricant particle powder Kind***: blending amount (part by mass) | Remarks |
| O1 | c: 50.0, d: 10.0 | 1.0 | Ni: 2.0 | C: 15.0, D: 20.0 | SR1: 2.0 | P1: 1.0 | |
| P1 | c: 50.0, d: 10.0 | 1.0 | Ni: 2.0 | D: 35.0 | SR1: 2.0 | P1: 1.0 | |
| Q1 | c: 60.0, d: 10.0 | 1.0 | Ni: 2.0 | A: 15.0 | SR1: 2.0 | P1: 1.0 | |
| R1 | c: 29.7, d: 10.0 | 1.3 | Ni: 2.0 | A: 20.0, E: 35.0 | SR1: 2.0 | P1: 1.0 | |
| R2 | c: 30.0, d: 10.0 | 1.0 | Ni: 2.0 | A: 35.0, E: 20.0 | SR1: 2.0 | P1: 1.0 | |
| S1 | c: 31.0, d: 10.0 | 1.0 | Ni: 2.0 | A: 20.0, E: 35.0 | SR1: 1.0 | P1: 1.0 | |
| T1 | c: 30.0, d: 10.0 | 1.0 | Ni: 2.0 | A: 20.0, E: 35.0 | SR1: 2.0 | P1: 1.0 | |
| U1 | c: 31.0, d: 10.0 | 1.0 | Ni: 2.0 | A: 20.0, E: 35.0 | SR1: 1.0 | P1: 1.0 | |
| V1 | c: 31.0, d: 10.0 | 1.0 | Ni: 2.0 | A: 20.0, F: 35.0 | SR1: 1.0 | P1: 1.0 | |
| W1 | c: 31.0, d: 10.0 | 1.0 | Ni: 2.0 | A: 20.0, G: 35.0 | SR1: 1.0 | P1: 1.0 | |
| X1 | c: 31.0, d: 10.0 | 1.0 | Ni: 2.0 | A: 20.0, H: 35.0 | SR1: 1.0 | P1: 1.0 | |
| Y1 | c: 31.0, d: 10.0 | 1.0 | Ni: 2.0 | A: 20.0, I: 35.0 | SR1: 1.0 | P1: 1.0 | |
| Z1 | c: 31.0, d: 10.0 | 1.0 | Ni: 2.0 | A: 20.0, J: 35.0 | SR1: 1.0 | P1: 1.0 | |
| Z2 | c: 21.0, d: 10.0 | 1.0 | Ni: 2.0 | B: 20.0, E: 45.0 | SR1: 1.0 | | |
| 1A | c: 98.5 | 1.0 | — | — | SR1: 0.5 | P1: 1.0 | For seating face side layer |
| 1B | c: 96.5 | 1.0 | — | C: 2.0 | SR1: 0.5 | P1: 1.0 | |

*see Table 3
**SR1: MnS
***P1: zinc stearate
Blending amount (part by mass): part by mass with respect to 100 parts by mass of the total amount of (iron-based powder + graphite powder + alloy element powder + hard-particle powder + solid lubricant particle powder)

TABLE 3

| Kind | Kind No. | Kind: average particle size |
|---|---|---|
| Iron-based powder | a | Atomized pure iron powder: average particle size 80 μm |
| | b | High-speed tool steel powder*: average particle size 60 μm |
| | c | Atomized pure iron powder: average particle size 35 μm (−#325) |
| | d | High-speed tool steel powder*: average particle size 35 μm (−#325) |
| | e | 3Cr alloy steel powder**: average particle size 80 μm |
| | f | 3Cr alloy steel powder**: average particle size 35 μm (−#325) |
| Hard-particle powder | A | Co-based intermetallic compound powder***: average particle size 25 μm (−#325), 700 $HV_{0.1}$ |
| | B | Co-based intermetallic compound powder***: average particle size 60 μm (−#100), 700 $HV_{0.1}$ |
| | C | Fe—Mo-type hard-particle powder: average particle size 60 μm (−#100), 1200 $HV_{0.1}$ |
| | D | Fe—Mo-type hard-particle powder: average particle size 25 μm (−#350), 1200 $HV_{0.1}$ |
| | E | Co-based hard-particle powder****: average particle size 60 μm (−#100), 1000 $HV_{0.1}$ |
| | F | Co-based hard-particle powder*****: average particle size 60 μm (−#100), 1000 $HV_{0.1}$ |
| | G | Co-based hard-particle powder******: average particle size 60 μm (−#100), 1000 $HV_{0.1}$ |
| | H | Co-based hard-particle powder*******: average particle size 60 μm (−#100), 1000 $HV_{0.1}$ |
| | I | Co-based hard-particle powder********: average particle size 60 μm (−#100), 1000 $HV_{0.1}$ |

TABLE 3-continued

| Kind | Kind No. | Kind: average particle size |
|---|---|---|
| | J | Co-based hard-particle powder*********: average particle size 60 μm (−#100), 1000 HV$_{0.1}$ |

*high-speed tool steel powder: 0.9% C—0.3% Si—0.2% Mn—4.0% Cr—5.0% Mo—6.0% W—2.0% V—Fe (balance)
**3Cr alloy steel powder: 3.0% Cr—0.3% Mo—0.3% V—Fe (balance)
***Co-based intermetallic compound powder: 9% Cr—28% Mo—3% Si—Co (balance)
****Co-based intermetallic compound powder: 45% Mo—10% Fe—4% Cr—3% Si—Co (balance)
*****Co-based intermetallic compound powder: 35% Mo—10% Fe—4% Cr—3% Si—Co (balance)
******Co-based intermetallic compound powder: 47% Mo—10% Fe—4% Cr—3% Si—Co (balance)
*******Co-based intermetallic compound powder: 45% Mo—3% Fe—4% Cr—3.5% Si—Co (balance)
********Co-based intermetallic compound powder: 40% Mo—15% Fe—4% Cr—2.7% Si—Co (balance)
*********Co-based intermetallic compound powder: 20% Mo—10% Ni—24% Cr—2% Si—Co (balance)

TABLE 4

| Sintered body No. | Mixed powder No. Face side layer | Mixed powder No. Seating face side layer | Chemical components of sintered body (% by mass) Valve-contacting face side layer (matrix part) | | | | | | | | | | | |
|---|---|---|---|---|---|---|---|---|---|---|---|---|---|---|
| | | | C | Co | Si | Ni | Mo | Cr | Mn | S | W | V | Total of others | Balance |
| 1 | A1 | 1A | 1.1 | 21.1 | 0.9 | 2.0 | 10.5 | 3.4 | 1.2 | 0.8 | 0.6 | 0.2 | 41.8 | Fe |
| 2 | B1 | 1A | 1.1 | 21.1 | 0.9 | 2.0 | 10.5 | 3.4 | 1.2 | 0.8 | 0.6 | 0.2 | 41.8 | Fe |
| 3 | C1 | 1A | 1.1 | 21.1 | 0.9 | 2.0 | 10.5 | 3.4 | 1.2 | 0.8 | 0.6 | 0.2 | 41.8 | Fe |
| 4 | C1 | 1A | 1.1 | 21.1 | 0.9 | 2.0 | 10.5 | 3.4 | 1.2 | 0.8 | 0.6 | 0.2 | 41.8 | Fe |
| 5 | D1 | 1A | 1.1 | 21.1 | 0.9 | 2.0 | 10.5 | 3.4 | 1.2 | 0.8 | 0.6 | 0.2 | 41.8 | Fe |
| 6 | E1 | 1A | 1.1 | 24.2 | 1.1 | 2.0 | 11.9 | 3.6 | 1.2 | 0.8 | 0.6 | 0.2 | 46.8 | Fe |
| 7 | F1 | 1A | 1.1 | 30.2 | 1.3 | 2.0 | 14.7 | 4.7 | 1.2 | 0.8 | 0.6 | 0.2 | 56.8 | Fe |
| 8 | G1 | 1A | 1.1 | 21.1 | 0.9 | 2.0 | 10.5 | 3.4 | 0.3 | 0.2 | 0.6 | 0.2 | 41.8 | Fe |
| 9 | H1 | 1A | 1.0 | 21.1 | 0.9 | 2.0 | 10.2 | 3.2 | 1.2 | 0.8 | 0.3 | 0.1 | 40.9 | Fe |
| 10 | I1 | 1A | 1.2 | 21.1 | 1.0 | 2.0 | 11.0 | 3.8 | 1.2 | 0.8 | 1.2 | 0.4 | 43.7 | Fe |
| 11 | J1 | 1A | 1.1 | 21.1 | 0.9 | 4.0 | 10.5 | 3.4 | 1.2 | 0.8 | 0.6 | 0.2 | 43.8 | Fe |
| 12 | K1 | 1A | 1.3 | 21.1 | 0.9 | 2.0 | 10.5 | 3.4 | 1.2 | 0.8 | 0.6 | 0.2 | 42.0 | Fe |
| 13 | L1 | 1A | 0.9 | 21.1 | 0.9 | 2.0 | 10.5 | 3.4 | 1.2 | 0.8 | 0.6 | 0.2 | 41.6 | Fe |
| 14 | M1 | 1A | 1.1 | 21.1 | 0.9 | 2.0 | 10.6 | 4.9 | 1.2 | 0.8 | 0.6 | 0.2 | 43.4 | Fe |
| 15 | N1 | 1A | 1.1 | 21.1 | 0.9 | 2.0 | 10.6 | 4.9 | 1.2 | 0.8 | 0.6 | 0.2 | 43.4 | Fe |
| 16 | O1 | 1A | 1.1 | — | — | 2.0 | 21.5 | 0.4 | 1.2 | 0.8 | 0.6 | 0.2 | 27.8 | Fe |
| 17 | P1 | 1A | 1.1 | — | — | 2.0 | 21.5 | 0.4 | 1.2 | 0.8 | 0.6 | 0.2 | 27.8 | Fe |
| 18 | Q1 | 1A | 1.1 | 9.1 | 0.4 | 2.0 | 4.8 | 1.7 | 1.2 | 0.8 | 0.6 | 0.2 | 21.9 | Fe |
| 19 | R1 | 1A | 1.4 | 33.2 | 1.6 | 2.0 | 21.9 | 3.5 | 1.2 | 0.8 | 0.6 | 0.2 | 66.4 | Fe |
| 20 | C1 | 1B | 1.1 | 21.1 | 0.9 | 2.0 | 10.5 | 3.4 | 1.2 | 0.8 | 0.6 | 0.2 | 41.8 | Fe |
| 21 | C1 | — | 1.1 | 21.1 | 0.9 | 2.0 | 10.5 | 3.4 | 1.2 | 0.8 | 0.6 | 0.2 | 41.8 | Fe |
| 22 | R2 | 1A | 1.1 | 28.7 | 1.5 | 2.0 | 19.5 | 4.2 | 1.2 | 0.8 | 0.6 | 0.2 | 58.7 | Fe |
| 23 | S1 | 1A | 1.1 | 25.4 | 1.6 | 2.0 | 21.9 | 3.5 | 0.6 | 0.4 | 0.6 | 0.2 | 56.2 | Fe |
| 24 | T1 | 1A | 1.1 | 25.4 | 1.6 | 2.0 | 21.9 | 3.5 | 1.2 | 0.8 | 0.6 | 0.2 | 57.2 | Fe |
| 25 | U1 | 1A | 1.1 | 25.4 | 1.6 | 2.0 | 21.9 | 3.5 | 0.6 | 0.4 | 0.6 | 0.2 | 56.2 | Fe |
| 26 | V1 | 1A | 1.1 | 28.9 | 1.6 | 2.0 | 18.4 | 3.5 | 0.6 | 0.4 | 0.6 | 0.2 | 56.2 | Fe |
| 27 | W1 | 1A | 1.1 | 24.7 | 1.6 | 2.0 | 22.6 | 3.5 | 0.6 | 0.4 | 0.6 | 0.2 | 56.2 | Fe |
| 28 | X1 | 1A | 1.1 | 27.7 | 1.8 | 2.0 | 21.9 | 3.5 | 0.6 | 0.4 | 0.6 | 0.2 | 58.7 | Fe |
| 29 | Y1 | 1A | 1.1 | 25.5 | 1.5 | 2.0 | 20.2 | 3.5 | 0.6 | 0.4 | 0.6 | 0.2 | 54.5 | Fe |
| 30 | Z1 | 1A | 1.1 | 27.5 | 1.3 | 5.5 | 13.2 | 10.5 | 0.6 | 0.4 | 0.6 | 0.2 | 56.0 | Fe |
| 31 | Z2 | 1A | 1.1 | 29.2 | 1.9 | 2.0 | 26.4 | 3.9 | 0.6 | 0.4 | 0.6 | 0.2 | 65.2 | Fe |

| Sintered body No. | Chemical components of sintered body (% by mass) Seating face side layer (matrix part) | | | | Structure of sintered body Valve-contacting face side layer | Remarks |
|---|---|---|---|---|---|---|
| | C | Others Mo, Si, Cr, Mn, W, V, Ni, S | Total of others | Balance | Number of hard-particles (particles/mm²) | |
| 1 | 1.0 | Mn: 0.3, S: 0.2 | 0.5 | Fe | 700 | Conventional Example |
| 2 | 1.0 | Mn: 0.3, S: 0.2 | 0.5 | Fe | 740 | Comparative Example |
| 3 | 1.0 | Mn: 0.3, S: 0.2 | 0.5 | Fe | 1867 | Example of the invention |
| 4 | 1.0 | Mn: 0.3, S: 0.2 | 0.5 | Fe | 1733 | Example of the invention |
| 5 | 1.0 | Mn: 0.3, S: 0.2 | 0.5 | Fe | 1333 | Example of the invention |

TABLE 4-continued

| No. | | | | | | Remarks |
|---|---|---|---|---|---|---|
| 6 | 1.0 | Mn: 0.3, S: 0.2 | 0.5 | Fe | 1600 | Example of the invention |
| 7 | 1.0 | Mn: 0.3, S: 0.2 | 0.5 | Fe | 1600 | Example of the invention |
| 8 | 1.0 | Mn: 0.3, S: 0.2 | 0.5 | Fe | 2100 | Example of the invention |
| 9 | 1.0 | Mn: 0.3, S: 0.2 | 0.5 | Fe | 1733 | Example of the invention |
| 10 | 1.0 | Mn: 0.3, S: 0.2 | 0.5 | Fe | 1933 | Example of the invention |
| 11 | 1.0 | Mn: 0.3, S: 0.2 | 0.5 | Fe | 1867 | Comparative Example |
| 12 | 1.0 | Mn: 0.3, S: 0.2 | 0.5 | Fe | 1867 | Example of the invention |
| 13 | 1.0 | Mn: 0.3, S: 0.2 | 0.5 | Fe | 1867 | Example of the invention |
| 14 | 1.0 | Mn: 0.3, S: 0.2 | 0.5 | Fe | 730 | Comparative Example |
| 15 | 1.0 | Mn: 0.3, S: 0.2 | 0.5 | Fe | 1733 | Example of the invention |
| 16 | 1.0 | Mn: 0.3, S: 0.2 | 0.5 | Fe | 1733 | Example of the invention |
| 17 | 1.0 | Mn: 0.3, S: 0.2 | 0.5 | Fe | 1867 | Example of the invention |
| 18 | 1.0 | Mn: 0.3, S: 0.2 | 0.5 | Fe | 1000 | Example of the invention |
| 19 | 1.0 | Mn: 0.3, S: 0.2 | 0.5 | Fe | 1200 | Example of the invention |
| 20 | 1.0 | Mo: 1.2, Mn: 0.3, S: 0.2 | 1.7 | Fe | 1867 | Example of the invention |
| 21 | — | — | — | — | 1867 | Example of the invention |
| 22 | 1.0 | Mn: 0.3, S: 0.2 | 0.5 | Fe | 1333 | Example of the invention |
| 23 | 1.0 | Mn: 0.3, S: 0.2 | 0.5 | Fe | 1200 | Example of the invention |
| 24 | 1.0 | Mn: 0.3, S: 0.2 | 0.5 | Fe | 1200 | Example of the invention |
| 25 | 1.0 | Mn: 0.3, S: 0.2 | 0.5 | Fe | 1767 | Example of the invention |
| 26 | 1.0 | Mn: 0.3, S: 0.2 | 0.5 | Fe | 1200 | Example of the invention |
| 27 | 1.0 | Mn: 0.3, S: 0.2 | 0.5 | Fe | 1200 | Example of the invention |
| 28 | 1.0 | Mn: 0.3, S: 0.2 | 0.5 | Fe | 1200 | Example of the invention |
| 29 | 1.0 | Mn: 0.3, S: 0.2 | 0.5 | Fe | 1200 | Conventional Example |
| 30 | 1.0 | Mn: 0.3, S: 0.2 | 0.5 | Fe | 1200 | Comparative Example |
| 31 | 1.0 | Mn: 0.3, S: 0.2 | 0.5 | Fe | 1833 | Example of the invention |

TABLE 5

| Sintered body No. | Process | Density of sintered body (g/cm$^3$) | Wear-resistance Ratio of wear amount (reference: 1.00) | Evaluation | Radial crushing strength Ratio of radial crushing strength (reference: 1.00) | Evaluation | Remarks |
|---|---|---|---|---|---|---|---|
| 1 | 2P2S | 7.2 | 1.00 | — | 1.00 | — | Conventional Example |
| 2 | 2P2S | 7.2 | 1.50 | x | 0.80 | x | Comparative Example |
| 3 | 2P2S | 7.2 | 0.60 | ○ | 1.40 | ○ | Example of the invention |
| 4 | 1P1S | 6.8 | 0.80 | ○ | 1.20 | ○ | Example of the invention |
| 5 | 2P2S | 7.2 | 0.90 | ○ | 1.10 | ○ | Example of the invention |

TABLE 5-continued

| Sintered body No. | Process | Density of sintered body (g/cm²) | Wear-resistance Ratio of wear amount (reference: 1.00) | Evaluation | Radial crushing strength Ratio of radial crushing strength (reference: 1.00) | Evaluation | Remarks |
|---|---|---|---|---|---|---|---|
| 6 | 2P2S | 7.2 | 0.58 | ○ | 1.40 | ○ | Example of the invention |
| 7 | 2P2S | 7.2 | 0.58 | ○ | 1.40 | ○ | Example of the invention |
| 8 | 2P2S | 7.2 | 0.65 | ○ | 1.50 | ○ | Example of the invention |
| 9 | 2P2S | 7.2 | 0.80 | ○ | 1.40 | ○ | Example of the invention |
| 10 | 2P2S | 7.2 | 0.58 | ○ | 1.40 | ○ | Example of the invention |
| 11 | 2P2S | 7.2 | 0.59 | ○ | 1.40 | ○ | Example of the invention |
| 12 | 2P2S | 7.2 | 0.60 | ○ | 1.50 | ○ | Example of the invention |
| 13 | 2P2S | 7.2 | 0.65 | ○ | 1.30 | ○ | Example of the invention |
| 14 | 2P2S | 7.2 | 1.01 | x | 0.90 | x | Comparative Example |
| 15 | 2P2S | 7.2 | 0.55 | ○ | 1.20 | ○ | Example of the invention |
| 16 | 2P2S | 7.2 | 1.50 | x | 1.20 | ○ | Example of the invention |
| 17 | 2P2S | 7.2 | 1.50 | x | 1.30 | ○ | Example of the invention |
| 18 | 2P2S | 7.2 | 0.98 | ○ | 1.40 | ○ | Example of the invention |
| 19 | 2P2S | 7.2 | 0.45 | ○ | 1.00 | ○ | Example of the invention |
| 20 | 2P2S | 7.2 | 0.60 | ○ | 1.40 | ○ | Example of the invention |
| 21 | 2P2S | 7.2 | 0.60 | ○ | 1.40 | ○ | Example of the invention |
| 22 | 2P2S | 7.2 | 0.30 | ○ | 1.10 | ○ | Example of the invention |
| 23 | 2P2S | 7.2 | 0.20 | ○ | 1.05 | ○ | Example of the invention |
| 24 | 2P2S | 7.2 | 0.20 | ○ | 1.10 | ○ | Example of the invention |
| 25 | 2P2S | 7.2 | 0.10 | ○ | 1.50 | ○ | Example of the invention |
| 26 | 2P2S | 7.2 | 0.25 | ○ | 1.20 | ○ | Example of the invention |
| 27 | 2P2S | 7.2 | 0.15 | ○ | 1.02 | ○ | Example of the invention |
| 28 | 2P2S | 7.2 | 0.14 | ○ | 1.02 | ○ | Example of the invention |
| 29 | 2P2S | 7.2 | 0.21 | ○ | 1.10 | ○ | Example of the invention |
| 30 | 2P2S | 7.2 | 0.60 | ○ | 1.50 | ○ | Example of the invention |
| 31 | FS | 7.4 | 0.05 | ○ | 1.05 | ○ | Example of the invention |

All of Examples of the invention are a valve seat insert (iron-matrix sintered body) which exhibits superior wear-resistance and a higher radial crushing strength compared to the Conventional Example (sintered body No. 1). On the other hand, Comparative Examples out of the range of the invention have a decreased wear-resistance, a decreased radial crushing strength, or both of them.

REFERENCE SIGNS LIST 1 valve seat insert
2 setting plate
3 heat source (LPG+ Air)
4 valve

The invention claimed is:
1. A wear-resistant valve seat insert for an internal combustion engine, comprising:
   two integrated layers, made by a sintered body,
   wherein a first layer of said two integrated layers, on the valve-contacting face side of the valve seat insert, has
   a matrix part composition that contains
   C: 0.3 to 2.0% by mass, one or more selected from the group consisting of Co, Si, Ni, Mo, Cr, Mn, S, W, and V at 70% by mass or less in total, and the balance being Fe and unavoidable impurities, and
   a matrix part structure which contains hard-particles at from 10 to 65% by mass with respect to a total amount of the layer on the valve-contacting face side and disperses the hard-particles at 1000 particles/mm² or more, wherein the hard-particles are Co-based intermetallic compound particles having a Vickers hardness $HV_{0.1}$ of from 500 to 1200 HV, and wherein a second layer of said two integrated layers, on the seating face side of the valve seat insert, has a matrix part composition that contains C: 0.3 to 2.0% by mass, one or more selected from the group consisting of Mo, Si, Ni, Cr, Mn, S, W and V, at 10% by mass or less in total, and the balance being Fe and unavoidable impurities.

2. The valve seat insert for an internal combustion engine according to claim 1, wherein solid lubricant particles are contained in the matrix part structure at from 0.5 to 2.0% by mass with respect to a total amount of the first layer.

3. The valve seat insert for an internal combustion engine according to claim 1, wherein solid lubricant particles are contained in a matrix phase of the second layer at from 0.5 to 2.0% by mass with respect to a total amount of the second layer.

4. The valve seat insert for an internal combustion engine according to claim 1, wherein the Co-based intermetallic compound particles are Mo—Fe—Cr—Si type Co-based intermetallic compound particles.

5. The valve seat insert for an internal combustion engine according to claim 4, wherein solid lubricant particles are contained in the matrix part structure at from 0.5 to 2.0% by mass with respect to a total amount of the first layer.

* * * * *